(12) United States Patent
Wuerstlein et al.

(10) Patent No.: US 9,744,835 B2
(45) Date of Patent: Aug. 29, 2017

(54) ACTUATING METHOD AND ACTUATING APPARATUS FOR A VEHICLE PART

(71) Applicant: BROSE FAHRZEUGTEILE GMBH & CO. KOMMANDITGESELLSCHAFT, HALLSTADT, Hallstadt (DE)

(72) Inventors: Holger Wuerstlein, Zeil Am Main (DE); Florian Pohl, Ebersdorf (DE); Sebastian Habermann, Werneck (DE); Juergen Schmitt, Rattelsdorf (DE); Maximilian Goetz, Bamberg (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 2 days.

(21) Appl. No.: 14/580,641

(22) Filed: Dec. 23, 2014

(65) Prior Publication Data
US 2015/0176322 A1  Jun. 25, 2015

(30) Foreign Application Priority Data

Dec. 23, 2013 (DE) .......................... 10 2013 022 102

(51) Int. Cl.
*B60J 7/12* (2006.01)
*B60J 5/14* (2006.01)
(Continued)

(52) U.S. Cl.
CPC .............. *B60J 7/1204* (2013.01); *B60J 5/047* (2013.01); *B60J 2007/1208* (2013.01);
(Continued)

(58) Field of Classification Search
CPC ... B60J 7/1204; B60J 5/047; B60J 2007/1208
See application file for complete search history.

(56) References Cited

U.S. PATENT DOCUMENTS 5,083,397 A * 1/1992 Koura .................... E05F 15/646
49/360
5,632,120 A * 5/1997 Shigematsu ............ E05B 81/66
49/360

(Continued)

FOREIGN PATENT DOCUMENTS

CN       101506457 A       8/2009
CN       103197922 A       7/2013
(Continued)

OTHER PUBLICATIONS

Espacenet Translation of DE102010046203A1, Stueber et al, Mar. 22, 2012, 13 pages.*

*Primary Examiner* — Dale W Hilgendorf
(74) *Attorney, Agent, or Firm* — Laurence A. Greenberg; Werner H. Stemer; Ralph E. Locher

(57) ABSTRACT

An actuating apparatus for a vehicle part contains an actuating motor for generating an actuating force under the action of which the vehicle part can be adjusted between a closed state and an open state along an actuating path. The actuating apparatus also contains a control unit which is configured to carry out an actuating method in which, according to the method, a position measure is continuously ascertained when the vehicle part is adjusted, the position measure being characteristic of the current actuating position of the vehicle part along the actuating path. Furthermore, the position measure is set to a prespecified reference value when the vehicle part is in the closed state and when a further condition is additionally met, the further condition being linked in a reproducible manner with a specific actuating position.

8 Claims, 2 Drawing Sheets

(51) Int. Cl.
  *B60J 5/04*   (2006.01)
  *E05F 15/70*  (2015.01)
  *E05F 15/40*  (2015.01)

(52) U.S. Cl.
  CPC ............... *E05F 15/40* (2015.01); *E05F 15/70* (2015.01); *E05Y 2900/548* (2013.01)

(56) References Cited

U.S. PATENT DOCUMENTS

| | | | | |
|---|---|---|---|---|
| 5,708,338 | A * | 1/1998 | Cook | H02H 7/0851 |
| | | | | 318/286 |
| 6,164,015 | A * | 12/2000 | Kawanobe | E05F 15/646 |
| | | | | 49/360 |
| 6,226,925 | B1 * | 5/2001 | Shimura | E05F 15/646 |
| | | | | 49/360 |
| 6,425,206 | B1 * | 7/2002 | Noda | E05F 15/638 |
| | | | | 49/360 |
| 6,525,499 | B2 * | 2/2003 | Naganuma | H02H 7/0851 |
| | | | | 49/28 |
| 6,729,071 | B1 * | 5/2004 | Kawanobe | E05F 15/646 |
| | | | | 49/360 |
| 7,073,291 | B2 * | 7/2006 | Kawanobe | E05F 15/646 |
| | | | | 49/360 |
| 7,698,855 | B2 * | 4/2010 | Imai | B60J 5/047 |
| | | | | 296/155 |
| 8,297,682 | B2 | 10/2012 | Oirsouw et al. | |
| 9,239,579 | B2 | 1/2016 | Schlesiger et al. | |
| 2002/0093301 | A1 * | 7/2002 | Itami | E05F 15/632 |
| | | | | 318/452 |
| 2009/0032325 | A1 | 2/2009 | Frieb-Preis et al. | |
| 2009/0293361 | A1 | 12/2009 | Heckmann et al. | |
| 2012/0245800 | A1 | 9/2012 | Koberstaedt et al. | |
| 2017/0030132 | A1 * | 2/2017 | Elie | B60J 5/047 |

FOREIGN PATENT DOCUMENTS

| | | | | |
|---|---|---|---|---|
| CN | 103375095 A | 10/2013 | | |
| DE | 102006039257 A1 | 2/2008 | | |
| DE | 202006018289 U1 | 9/2008 | | |
| DE | 102009028249 A1 | 2/2011 | | |
| DE | 102010046203 A1 * | 3/2012 | ............ | E05F 15/611 |
| DE | 102007030496 B4 | 4/2012 | | |

* cited by examiner

ACTUATING METHOD AND ACTUATING APPARATUS FOR A VEHICLE PART

CROSS-REFERENCE TO RELATED APPLICATION

This application claims the priority, under 35 U.S.C. §119, of German application DE 10 2013 022 102.1, filed Dec. 23, 2013; the prior application is herewith incorporated by reference in its entirety.

BACKGROUND OF THE INVENTION

Field of the Invention

The invention relates to an actuating method for a vehicle part, in particular to a vehicle part which can be adjusted between a closed state and an open state by an actuating motor. The invention further relates to an actuating apparatus for a vehicle part of this kind.

Motor vehicles often have vehicle parts which can be adjusted automatically, usually by an electric actuating motor. Vehicle parts of this kind include, for example, vehicle windows, sliding roofs or vehicle doors (in particular in the form of a cargo space door which is also called a rear hatch or cargo space lid). When adjusting, in particular, vehicle windows and sliding roofs, the actuating motor of the vehicle windows or sliding roofs is often driven until the window strikes a stop or the vehicle user emits a stop signal. However, in the case of vehicle doors, in particular in the case of rear hatches, the open position is usually not pre-specified mechanically but rather by control technology (and possibly such that it can be set in a user-specific manner). Therefore, in the case of the vehicle door, a measure for the current actuating position (position measure) is ascertained during opening, and the opening movement is terminated when the value of the position measure indicates the intended open position.

The position measure can, in principle, be ascertained on the basis of a travel sensor which is separate from the actuating motor. However, the position measure is often determined on the basis of a (motor) measurement variable, in particular on the basis of the number of revolutions of the rotor of the actuating motor. This measurement variable is usually detected as part of the control of the actuating motor—for example by a Hall sensor—in any case. Therefore, additional expenditure on measurement (that is to say the separate travel sensor) can be saved.

Here and in the text which follows, the "actuating position" is to be understood to mean, in particular, the exact position of the vehicle part itself in space. The position measure is used as a characteristic measure of this actuating position. In this case, 'characteristic' means that the position measure contains quantitative information about the actuating position.

However, there may be a deviation between the ascertained position measure and the actual actuating position of the vehicle part in the event of adjustment of the vehicle part. The deviation occurs, for example, on account of play and/or slip in the region of the drive, in particular in a drive mechanism which is usually arranged downstream of the actuating motor, (for example a gear mechanism and/or a cable-pull mechanism), and also on account of elastic deformations. In addition, in particular if the vehicle part (in particular the vehicle door) is adjusted manually when the actuating motor is activated or even inactive, the deviation between the ascertained position measure and the actual actuating position may become particularly large. In this case, the deviation can increase in the event of several successive adjustment processes and, in a subsequent adjustment process, lead to the opened and/or closed state being inaccurately approached.

The ascertained position measure is often also used as part of a trapping-prevention operation in order to compare the adjustment speed of the vehicle part or the actuating force of the actuating motor with reference values which are stored depending on the actuating position. In the event of a deviation between the actual actuating position and the ascertained position measure, there may be a malfunction (incorrect triggering or non-identification of a trapping instance) which adversely affects the functional reliability of the trapping-prevention device.

In order to keep the deviation of the position measure from the actual actuating position of the vehicle part low, the position measure is usually generally related in a defined manner with the position of the vehicle part by calibration (referencing). In the case of a rear hatch, this calibration is generally carried out when the rear hatch is in its closed state. However, this kind of calibration is comparatively inaccurate since—depending on the course of the preceding closing process—both the actuating position of the rear hatch in the closed state and the associated motor position can vary to a certain extent.

SUMMARY OF THE INVENTION

The invention is based on the object of allowing precise determination of the actuating position of an adjustable vehicle part even over a large number of adjustment processes.

According to the invention, the actuating method is used with a vehicle part which can be adjusted between a closed position and an open position along an actuating path by a (preferably electric) actuating motor.

According to the method, during the adjustment of the vehicle part, a position measure is continuously ascertained, the position measure being a characteristic of the current actuating position of the vehicle part along the actuating path. In this case, the position measure is set to a prespecified reference value when (as a first condition) the vehicle part is in the closed state and when, additionally, a further (second) condition is met, the further condition being linked in a reproducible manner with a specific actuating position. The additional condition is therefore selected in such a way that, when the additional condition is fulfilled, it is ensured that the vehicle part is always in this specific actuating position (in a reproducible manner). The closed state of the vehicle part is therefore linked to a specific actuating position under the additional condition.

The position measure is set to the prespecified reference value ("referenced") only when both conditions together are met—that is to say when the vehicle part is in the closed state and when the additional condition is met. Otherwise, the position measure is not set to the reference value.

The position measure is preferably ascertained on the basis of a motor variable, for example on the basis of a number of revolutions of the rotor, of the actuating motor. Within the scope of the invention, the motor variable can be used directly as a position measure. However, as an alternative, the position measure can also reflect another value for the actuating position—for example a pivoting angle or a distance traveled. In this case, the motor variable can be, for example, in direct or indirect proportion to the position measure. However, furthermore, the motor variable can also be related to the position measure in a non-linear, for example a logarithmic, exponential or nominal (that is to say quadratic, cubic etc.) manner. However, as an alternative, it is also feasible within the scope of the invention for the position measure to be detected by a separate travel sensor.

Since the vehicle part generally bears against a seal or another kind of stop in the closed state, the vehicle part is, as is known, in a position in relation to the adjacent (stationary) vehicle body with a comparatively high level of reproducibility in the closed state. However, since the position measure is referenced only when the additional condition is met, a deviation which may occur (for measurement-related and/or mechanical reasons) between the ascertained position measure and the actual actuating position of the vehicle part can be counteracted in a particularly effective manner. A deviation of this kind occurs, for example, due to elastic deformations, play and/or slip in the region of a drive mechanism which is downstream of the actuating motor.

Since the additional condition has to be met, this advantageously prevents the position measure having an abnormally large deviation from the actual actuating position of the vehicle part during referencing. Therefore, the additional condition ensures that the ascertained position measure already particularly precisely corresponds to the actual actuating position of the vehicle part before referencing. This allows precise determination of the actuating position of the vehicle part during the adjustment, and also increases the accuracy of reproducibility of the positioning of the vehicle part. Obstacle identification which is as precise as possible is also made possible in the case of the position measure being evaluated as part of a trapping-prevention or collision-prevention operation.

Within the scope of the invention, the adjustable vehicle part can be, in principle, a vehicle window, a sliding roof, a folding roof of a convertible or the like. However, the vehicle part is preferably an automatically adjustable vehicle door, in particular a cargo space door (also called cargo space lid or rear hatch). With vehicle doors in particular, it is occasionally the case that a vehicle user moves the vehicle door manually—in addition to the activated actuating motor or else when the actuating motor is inactive. Unintended manual adjustment of this kind generally leads—on account of elastic deformations and/or play and also possibly slip in the drive mechanism—to particularly large deviations between the actual actuating position of the vehicle door and the ascertained position measure. The additional condition is advantageously selected in such a way that it is—at least initially—not met in this unintended state and therefore the position measure is not referenced.

In an expedient variant, the closed state is identified in that a closing signal which is output by a closing signal generator is detected. That is to say, the closing signal generator outputs the closing signal when the vehicle part is in the closed state. The closing signal generator is, for example, a contact switch (for example a microswitch) which is tripped when the vehicle part is arranged in the closed state, that is to say enters the associated closed position. If the vehicle part is the vehicle door, the closing signal generator is preferably in the form of part of the associated door lock and, in particular, is configured to emit the closing signal when a lock catch (preferably the main catch) is closed. As an alternative, within the scope of the invention, the closing signal generator can also be associated with a closing aid of the door lock and emit the closing signal when the closing process is concluded.

In an expedient method variant, the position measure is set to the prespecified reference value only under the additional condition that the actuating motor has been activated in order to adjust the vehicle part, and that the vehicle part has been adjusted out of the intended open state. In this case, "intended" is to be understood to mean that the open state describes a firmly prespecified open position of the vehicle part or an open position of the vehicle part which is stored at least in a user-specific manner (for subsequent adjustment processes). An intermediate position which is arbitrarily selected during individual opening of the vehicle part is not understood to mean an intended open date in this context. Therefore, in particular, the vehicle part has to be adjusted automatically and over the entire actuating path. Passing over the entire actuating path ensures, for example, that the vehicle part has a sufficient amount of kinetic energy to enter the closing region in synchronism with the drive mechanism (that is to say with as slight a deviation as possible between the position measure and the actual actuating position) when entering the closed state and, in the process, to possibly compress a seal in a reproducible manner and/or trigger a closing mechanism (for example the door lock and/or the closing aid).

As an alternative, it is also feasible within the scope of the invention for the vehicle part to have to be moved only by a prespecified portion of the actuating path, for example by half or two thirds of the actuating path, in order to trigger the referencing of the position measure. This is expedient particularly when the adjustment by the prespecified portion already allows a sufficiently reproducible arrangement of the vehicle part (and also of the drive mechanism) in the closed state.

In a particularly preferred method variant, the position measure is referenced only under the additional condition that, during the adjustment—in particular the adjustment driven by the actuating motor—the adjustment speed of the vehicle part was within a prespecified tolerance range around a stored reference speed. In this case, the reference speed is preferably stored in a position-dependent or time-dependent manner. In other words, a profile of the reference speed is defined, and the speed profile of the vehicle part has to correspond to the profile within prespecified limits (tolerance range). As a result, it is possible to easily check whether the vehicle part is moved by the actuating force of the actuating motor alone or (in addition or as an alternative) is (or has been) adjusted manually by a vehicle user. In the event of manual adjustment of the vehicle part, the adjustment speed specifically generally deviates from the reference speed.

In this case, it is feasible within the scope of the invention, in principle, for the profile of the adjustment speed to be compared (retrospectively) with the reference profile only when the closing signal is detected. However, the adjustment speed is preferably already continuously compared with the reference speed during the adjustment of the vehicle part. It is moreover also feasible within the scope of the invention for the adjustment speed to be compared with the reference speed only in a comparatively short section of the actuating path which directly precedes the closed state (called the "closing region").

In a further expedient method variant, the position measure is referenced only under the additional condition that the actuating motor has further remained activated in the closing direction by a prespecified actuating measure after reaching the closed state. As a result, play in the drive mechanism can advantageously be compensated for before the referencing of the position measure, and the position measure can be matched to the actual actuating position. In this case, it is feasible within the scope of the invention for the actuating measure to be characteristic of a closing value, which is to be applied by the actuating motor, of the actuating force. That is to say that the closed state is linked with the associated, defined closed position only when a prespecified closing force is applied. However, as an alternative, the actuating measure is preferably revolutions of the rotor of the actuating motor. Within the scope of the method according to the invention, the actuating motor is preferably deliberately further driven by a prespecified number of revolutions in order to drive a reproducible actuating position of the vehicle part, which actuating position is suitable for the referencing, in the closed state.

In an alternative and expedient method variant, the position measure is referenced only under the additional condition that the actuating motor has remained activated in the closing direction up until triggering of a block switch-off operation after reaching the closed state. In this case, the block switch-off operation is preferably an automatic switch-off operation of the actuating motor when an end position of the drive mechanism is reached. The block switch-off operation generally serves to prevent mechanical overloading of the drive mechanism when, for example, a position signal which is associated with the end position of the vehicle part is incorrectly not detected. For the purpose of the block switch-off operation, an element of the drive mechanism often strikes a stop and in the process trips an (end) switch. Within the scope of the method according to the invention, the actuating motor is preferably deliberately operated until the block switch-off operation.

In this case, in an expedient development, the position measure is additionally referenced, in particular, only under the condition that the actuating motor was activated against the closing direction by a prespecified actuating measure—in particular by a prespecified number of revolutions—after triggering of the block switch-off operation. Therefore, after the block switch-off operation, the actuating motor (and therefore the drive mechanism) is partially readjusted again (in the opening direction) and then referenced. As a result, the drive mechanism is, in particular, moved to a defined position, so that play of the drive mechanism is already compensated for before a subsequent opening movement. This resetting of the actuating motor is preferably performed in a deliberate manner within the scope of the method according to the invention.

An (active) check is preferably made within the scope of the actuating method to ensure that the additional condition is met. By way of example, at the start of the adjustment, a check is made to determine whether the position measure corresponds to the open position at least within prespecified tolerances. However, it is also possible within the scope of the invention to ensure in respect of control for each adjustment which is driven by the actuating motor that the actuating motor was further activated after the closed state was reached (by the prespecified actuating measure or until the block switch-off operation etc.). In this case, provision can also be made within the scope of the invention for the actuating motor to be activated, for example until the block switch-off operation or by the prespecified actuating measure, independently of the preceding (manual or automatic) adjustment of the vehicle part after the closed state is reached.

The actuating apparatus according to the invention for the vehicle part contains the actuating motor for generating the actuating force under the action of which the vehicle part can be adjusted between the closed state and the open state along the actuating path. Furthermore, the actuating apparatus contains a control unit which is configured (in respect of circuitry or programming) to automatically carry out the actuating method in the above-described manner. In other words, the control unit is configured during adjustment of the vehicle part to determine the position measure and then to reference the position measure when the vehicle part is in the closed state and at least one of the above-described additional conditions is met.

Within the scope of the invention, the control unit can be in the form of a non-programmable electronic circuit and, in this case, be integrated into a control system of the actuating motor. However, the control unit is preferably formed by a microcontroller in which the functionality for carrying out the actuating method according to the invention is implemented in the form of a software module. In this case, this software module can form, in particular, a constituent part of extensive control software (firmware) of the control system of the actuating motor.

Other features which are considered as characteristic for the invention are set forth in the appended claims.

Although the invention is illustrated and described herein as embodied in an actuating method and an actuating apparatus for a vehicle part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables which correspond to one another are always provided with the same reference symbols in all of the figures.

Figure 1:
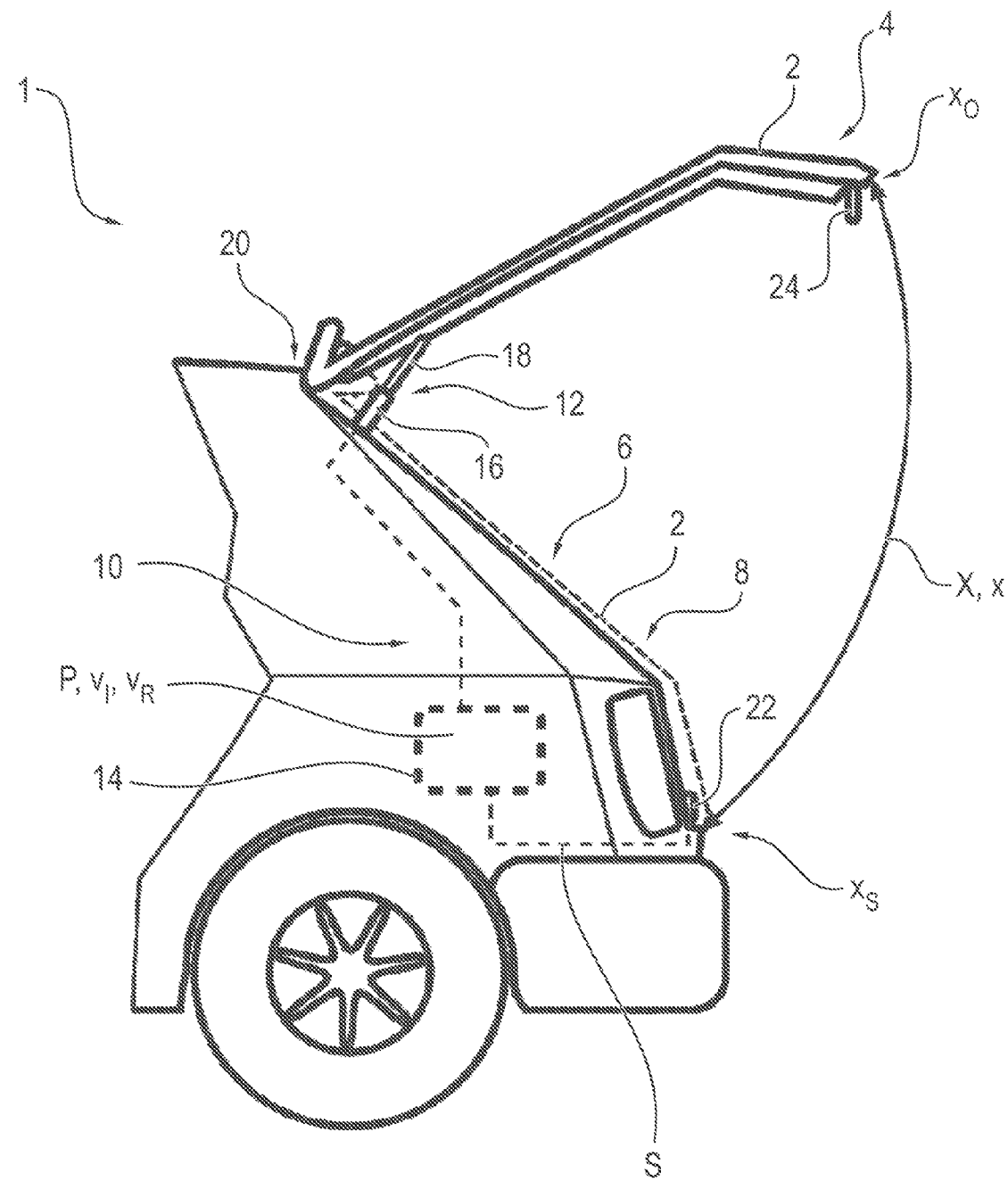
FIG. 1 is a diagrammatic, side view of a rear of a vehicle with a rear hatch open and with an actuating apparatus which is associated with the rear hatch.

Referring now to the figures of the drawings in detail and first, particularly to FIG. 1 thereof, there is shown a schematic detail of a rear of a vehicle 1. The vehicle 1 has a vehicle door, which is in the form of a rear hatch 2 and can be automatically adjusted between an open state 4 and a closed state 6 along an actuating path X. The rear hatch 2 therefore forms an adjustable vehicle part of the vehicle 1 for reversibly closing a cargo space opening 8.

For the purpose of adjusting the rear hatch 2, the vehicle 1 contains an actuating apparatus 10 which, in turn, contains an actuating drive 12 and also a control unit 14. The actuating drive 12 is subdivided into an actuating motor 16 and a drive mechanism 18 which is arranged between the actuating motor 16 and the rear hatch 2—in the illustrated exemplary embodiment, the drive mechanism 18 is, by way of example, a spindle drive.

In the closed state 6, the rear hatch 2 (indicated in dashed lines here) bears against the vehicle body which borders the cargo space opening 8. In the open state 4, the rear hatch 2 is pivoted about a pivot axis, which runs along a roof upper edge 20, in such a way that the cargo space opening 8 is open for loading or unloading. In this case, an actuating position x of the rear hatch 2 which is designated open position $x_O$ is assigned to the open state 4 in the control unit 14. Accordingly, a closed position $x_S$ is assigned to the closed state 4.

A door lock 22 is arranged on the vehicle body. A striker 24 which is arranged on the rear hatch 2 is situated in the door lock 22 in the closed state 6 and is latched to a lock catch of the door lock 22.

The control unit 14 drives the actuating motor 16 during adjustment of the rear hatch 2. The rotor of the actuating motor transmits an actuating force to the drive mechanism 18 and therefore to the rear hatch 2. During the adjustment, the control unit 14 detects the revolutions of the rotor and, from the revolutions, ascertains a position measure P which is characteristic of the actuating position x of the rear hatch 2 along the actuating path X. When the rear hatch 2 is adjusted to the open position $x_O$, the actuating motor 16 is driven until the position measure P has a value which corresponds to the value of the open position $x_O$.

In order that the position measure P reflects the actual actuating position x of the rear hatch 2 as precisely as possible, the control unit 14 is configured to regularly reset the position measure P to a prespecified reference value, that is to say to reference the position measure. During the referencing, the rear hatch 2 is advantageously arranged in a known actuating position x which can be adjusted in as reproducible a manner as possible. The closed state 6 is particularly suitable for this purpose since the rear hatch 2 bears against the vehicle body in this case. In order to indicate that the rear hatch 2 is closed, a closing signal transmitter is associated with the door lock 22. The closing signal transmitter is configured to emit a closing signal S to the control unit 14 when the lock catch is latched in around the striker 24. However, the ascertained position measure P may deviate from the actual position (that is to say the actual actuating position x) of the rear hatch 2 on account of play, slip or elastic deformations in the region of the actuating drive 12. For example, the striker 24 may already be in a latched-in position, while the actuating drive 12 is still adjusted in such a way that the ascertained position measure P indicates a slightly opened position of the rear hatch 2. In this case, referencing of the position measure P would lead to incorrect positioning of the rear hatch 2 and of the actuating drive 12 in relation to one another, and therefore to a subsequent misinterpretation of the actual actuating position x.

Therefore, the control unit 14 is configured to reference the position measure P to the closed position $x_S$ as part of an actuating process which will be described in greater detail below only when two prespecified conditions are met. These conditions are selected in such a way that a reproducible arrangement of the rear hatch 2 and of the drive mechanism 18 is ensured in the closed position $x_S$, so that the position measure P deviates as little as possible from the actual closed position $x_S$.

Figure 2:
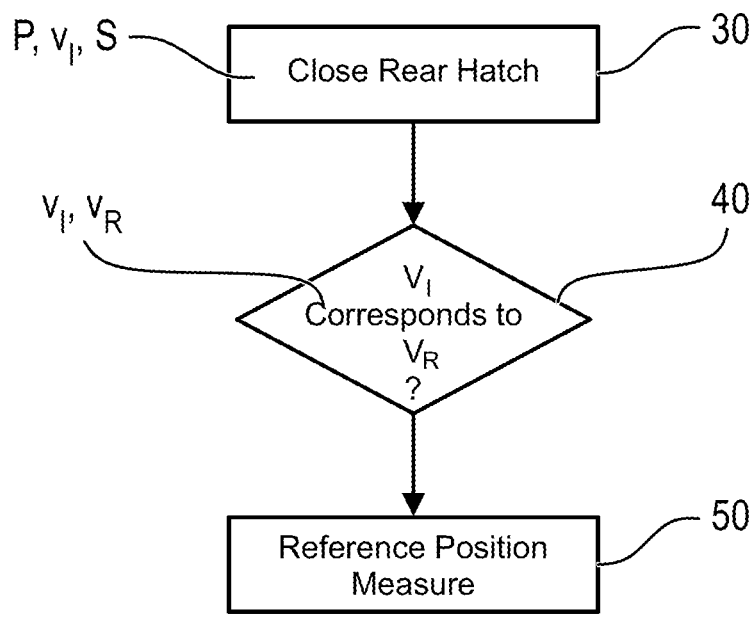
FIGS. 2 and 3 are flowcharts of an exemplary embodiment of an actuating method which is carried out by the actuating apparatus for adjusting the rear hatch according to the invention.

FIG. 2 shows a schematic flowchart of the actuating method. In a first method step 30, the control unit 14 controls the actuating motor 16 for the purpose of closing the rear hatch 2, that is to say for the purpose of adjustment from the open state 4 to the closed state 6. During the adjustment process, the control unit 14 continuously ascertains the position measure P and, from the position measure, determines an adjustment speed $v_I$. When the striker 24 of the rear hatch 2 enters the door lock 22, the control unit 14 receives the closing signal S. The detection of the closing signal S represents a first condition for referencing of the position measure P.

In response to the detection of the closing signal S, the control unit 14 checks, in a checking step 40 as a second condition, whether the adjustment speed $v_I$ has corresponded to a reference speed $v_R$, which is stored in the control unit 14, within prespecified limits. In this case, the reference speed $v_R$ is stored in an actuating position-dependent manner. The ascertained values of the adjustment speed $v_I$ are temporarily stored in the control unit 14 for this retrospective check. If the adjustment speed $v_I$ corresponds to the reference speed $v_R$, the control unit 14 interprets the adjustment of the rear hatch 2 to be as intended and references the position measure P in a concluding method step 50.

If the adjustment speed $v_1$ deviates from the reference speed $v_R$ beyond the prespecified limits, the control unit 14 does not reference the position measure P.

In an alternative method variant which is not illustrated further, the control unit 14 continuously compares the adjustment speed $v_I$ with the reference speed $v_R$ as early as during the adjustment. Therefore, the information in respect of whether the adjustment is running as intended is already available during detection of the closing signal S.

At the beginning of each adjustment, the adjustment speed $v_I$ can deviate from the reference speed $v_R$ during the start-up phase of the actuating motor 16 (on account of the acceleration). In order to not incorrectly interpret this deviation as an abnormal deviation, it is feasible within the scope of the invention for the start-up phase to be suppressed in the comparison with the reference speed $v_R$.

In a further alternative method variant, the control unit 14 checks, in the checking step 40 as a second condition, whether the adjustment of the rear hatch 2 out of the open state 4 has taken place. In this case, the referencing is likewise carried out only when this condition is met.

Figure 3:
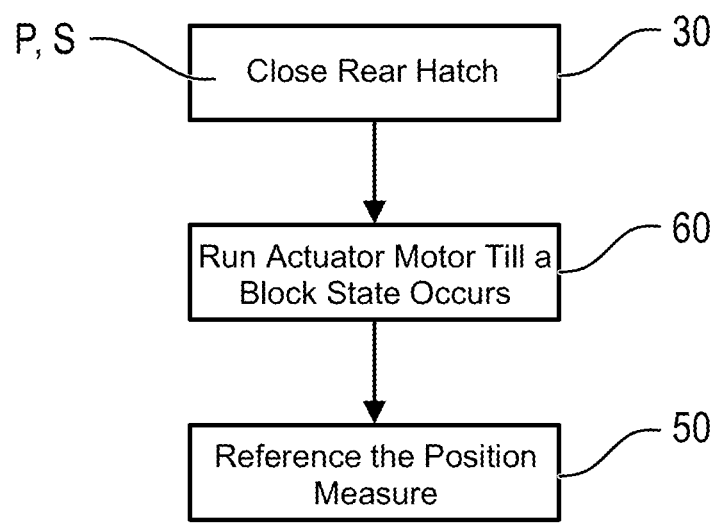

In an alternative method variant according to FIG. 3, after detection of the closing signal S, in a method step 60, the control unit 14 drives the actuating motor 16 until the rear hatch 2 is braced against the vehicle body and the actuating motor 16 is blocked as a result. In this case, the actuating motor 16 is switched off by a so-called block switch-off operation. The control unit 16 then drives the actuating motor 16 for a prespecified number of rotor revolutions in the opposite direction (opening direction). As a result, play of the drive mechanism 18 is compensated for in a defined manner. In this state, the actuating drive 16 is mounted in an approximately force-free manner and the position measure P has a particularly low deviation from the closed position $x_S$. The control unit 14 then references the position measure P in method step 50.

In a further alternative method variant, after detection of the closing signal S, in method step 60, the control unit 14 further drives the actuating motor 16 by a prespecified number of rotor revolutions in the closing direction. As a result, run-on of the drive mechanism 18 in relation to the rear hatch 2 can be compensated for. The control unit 14 then once again carries out the referencing in method step 50.

The subject matter of the invention is not limited to the exemplary embodiments described above. Rather, further embodiments of the invention can be derived from the above description by a person skilled in the art. In particular, the individual features of the invention which are described with reference to the various exemplary embodiments and the design variants of said individual features can also be combined with one another in a different way.

The following is a summary list of reference numerals and the corresponding structure used in the above description of the invention:
1 Vehicle
2 Rear hatch
4 Open state
6 Closed state
8 Cargo space opening
10 Actuating apparatus
12 Actuating drive
14 Control unit
16 Actuating motor
18 Drive mechanism
20 Roof upper edge
22 Door lock
24 Striker
30 Method step
40 Checking step
50 Method step
60 Method step
X Actuating path
x Actuating position
$x_S$ Closed position
$x_O$ Open position
P Position measure
S Closing signal
$v_I$ Adjustment speed
$v_R$ Reference speed

The invention claimed is:

1. An actuating method for a vehicle part being adjusted between a closed state and an open state along an actuating path by an actuating motor, which comprises the steps of:
performing an adjustment of the vehicle part by the further steps of:
ascertaining continuously a position measure, the position measure being a characteristic of a current actuating position of the vehicle part along the actuating path;
resetting the position measure to a prespecified reference value when the vehicle part is in the closed state and when an additional condition is further met, the additional condition being linked in a reproducible manner with a specific actuating position; and
resetting the position measure to the prespecified reference value only under the additional condition that, during the adjustment, an adjustment speed of the vehicle part was within a prespecified tolerance range around a stored reference speed.

2. The actuating method according to claim 1, which further comprises identifying the closed state upon detecting a closing signal which is output by a closing signal generator.

3. The actuating method according to claim 1, which further comprises setting the position measure to the prespecified reference value only under the additional condition that the actuating motor has been activated in order to adjust the vehicle part, and that the vehicle part has been adjusted out of the open state.

4. The actuating method according to claim 1, which further comprises resetting the position measure to the prespecified reference value only under the additional condition that the actuating motor has further remained activated in a closing direction by a prespecified actuating measure after reaching the closed state or up until triggering of a block switch-off operation after reaching the closed state.

5. The actuating method according to claim 1, which further comprises setting the position measure to the prespecified reference value only under the additional condition that the actuating motor has remained activated in a closing direction up until triggering of a block switch-off operation after reaching the closed state.

6. The actuating method according to claim 5, which further comprises setting the position measure to the prespecified reference value only under the additional condition that the actuating motor was activated against the closing direction by a prespecified actuating measure after triggering of the block switch-off operation.

7. An actuating apparatus for a vehicle part, the apparatus comprising:
an actuating motor for generating an actuating force under an action of which the vehicle part can be adjusted between a closed state and an open state along an actuating path; and
a control unit programmed to perform an adjustment of the vehicle part by the steps of:
ascertaining continuously a position measure, the position measure being a characteristic of a current actuating position of the vehicle part along the actuating path;
resetting the position measure to a prespecified reference value when the vehicle part is in the closed state and when an additional condition is further met, the additional condition being linked in a reproducible manner with a specific actuating position; and
resetting the position measure to the prespecified reference value only under the additional condition that, during the adjustment, an adjustment speed of the vehicle part was within a prespecified tolerance range around a stored reference speed.

8. The actuating apparatus according to claim 7, wherein said control unit is programmed to perform said adjustment of the vehicle part by resetting the position measure to the prespecified reference value only under the additional condition that the actuating motor has further remained activated in a closing direction by a prespecified actuating measure after reaching the closed state or up until triggering of a block switch-off operation after reaching the closed state.

* * * * *